(12) United States Patent
Lenk et al.

(10) Patent No.: US 9,537,189 B2
(45) Date of Patent: Jan. 3, 2017

(54) TEMPERATURE CONTROL SYSTEM FOR A HIGH-TEMPERATURE BATTERY OR A HIGH-TEMPERATURE ELECTROLYZER

(71) Applicant: Siemens Aktiengesellschaft, Munich (DE)

(72) Inventors: Uwe Lenk, Zwickau (DE); Alexander Tremel, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/406,208

(22) PCT Filed: May 14, 2013

(86) PCT No.: PCT/EP2013/059900
§ 371 (c)(1),
(2) Date: Dec. 6, 2014

(87) PCT Pub. No.: WO2013/185994
PCT Pub. Date: Dec. 19, 2013

(65) Prior Publication Data
US 2015/0221997 A1    Aug. 6, 2015

(30) Foreign Application Priority Data

Jun. 11, 2012 (DE) .......... 10 2012 209 698

(51) Int. Cl.
*H01M 10/60* (2014.01)
*H01M 10/63* (2014.01)
(Continued)

(52) U.S. Cl.
CPC .............. *H01M 10/63* (2015.04); *C25B 15/00* (2013.01); *C25B 15/02* (2013.01);
(Continued)

(58) Field of Classification Search
CPC .......................... H01M 10/658; H01M 10/613
See application file for complete search history.

(56) References Cited

U.S. PATENT DOCUMENTS

| | | |
|---|---|---|
| 3,917,520 A | 11/1975 | Hirschenhofer |
| 2002/0110714 A1 | 8/2002 | Andrews et al. |

(Continued)

FOREIGN PATENT DOCUMENTS

| | | |
|---|---|---|
| CN | 1516310 A | 7/2004 |
| CN | 101013759 A | 8/2007 |

(Continued)

OTHER PUBLICATIONS

JP Office Action, dated Jun. 7, 2016, for JP application No. 2015-515449.

(Continued)

*Primary Examiner* — Stewart Fraser
*Assistant Examiner* — Olatunji Godo
(74) *Attorney, Agent, or Firm* — Beusse Wolter Sanks & Maire

(57) ABSTRACT

A control system for controlling the temperature in a high-temperature battery to which hot air is supplied via an air duct system or in a high-temperature electrolyzer to which hot air is supplied via an air duct system is provided. The control system includes at least two temperature probes designed to detect the temperature at two different points in the air duct system, at least one first air-conditioning unit for physically conditioning the air, mounted in the air duct system upstream of the high-temperature battery or high-temperature electrolyzer, and a recirculation duct which recirculates hot air discharged from the high-temperature battery or high-temperature electrolyzer to a point in the air duct system upstream of the high-temperature battery or high-temperature electrolyzer and feeds the hot air back into (Continued)

the air duct system. The control system controls the first air-conditioning unit in accordance with the temperatures detected by the temperature probes.

14 Claims, 4 Drawing Sheets

(51) Int. Cl.
*C25B 15/02* (2006.01)
*H01M 10/48* (2006.01)
*H01M 8/04* (2016.01)
*C25B 15/00* (2006.01)
*H01M 10/39* (2006.01)
*H01M 12/00* (2006.01)

(52) U.S. Cl.
CPC ... *H01M 8/04007* (2013.01); *H01M 8/04335* (2013.01); *H01M 8/04365* (2013.01); *H01M 8/04708* (2013.01); *H01M 8/04738* (2013.01); *H01M 10/39* (2013.01); *H01M 10/486* (2013.01); *H01M 12/00* (2013.01); *Y02E 60/366* (2013.01); *Y02E 60/50* (2013.01)

(56) References Cited

U.S. PATENT DOCUMENTS

| | | |
|---|---|---|
| 2004/0013913 A1 | 1/2004 | Makiel et al. |
| 2004/0121199 A1 | 6/2004 | Baran et al. |
| 2005/0037302 A1 | 2/2005 | Schonert |
| 2007/0000789 A1 | 1/2007 | Bourgeois et al. |
| 2007/0065693 A1 | 3/2007 | Tighe et al. |
| 2007/0178346 A1 | 8/2007 | Kiya et al. |
| 2007/0298298 A1 | 12/2007 | Ishigaki et al. |
| 2009/0104482 A1 | 4/2009 | Miyazaki |
| 2009/0148727 A1 | 6/2009 | Taniguchi et al. |
| 2009/0191434 A1 | 7/2009 | Kaeding et al. |
| 2009/0195210 A1 | 8/2009 | Takeuchi et al. |
| 2009/0253028 A1 | 10/2009 | Takagi |
| 2009/0258260 A1 | 10/2009 | Naganuma |
| 2009/0317694 A1 | 12/2009 | ngquist et al. |
| 2009/0321532 A1* | 12/2009 | Maitre ............... B60H 1/00278 236/91 R |
| 2010/0132388 A1 | 6/2010 | Oyobe et al. |
| 2011/0136031 A1 | 6/2011 | Sato et al. |
| 2011/0220516 A1 | 9/2011 | Finfrock et al. |
| 2012/0105206 A1 | 5/2012 | Huang et al. |

FOREIGN PATENT DOCUMENTS

| | | |
|---|---|---|
| CN | 101073176 A | 11/2007 |
| CN | 101443940 A | 5/2009 |
| CN | 101499545 A | 8/2009 |
| CN | 101542824 A | 9/2009 |
| CN | 101584069 A | 11/2009 |
| CN | 101687457 A | 3/2010 |
| DE | 102009057720 A | 6/2011 |
| DE | 102009057720 A1 | 6/2011 |
| DE | 102010038599 A | 6/2011 |
| EP | 2650401 A1 | 10/2013 |
| JP | H08148190 A | 6/1996 |
| JP | 2004022496 A | 1/2004 |
| JP | 2004168186 A | 6/2004 |
| JP | 2006120334 A | 5/2006 |
| JP | 2006139998 A | 6/2006 |
| JP | 2006309975 A | 11/2006 |
| JP | 2008204764 A | 9/2008 |
| JP | 2008218236 A | 9/2008 |
| JP | 2008311140 A | 12/2008 |
| JP | 2009117086 A | 5/2009 |
| JP | 2010057292 A | 3/2010 |
| JP | 2010107122 A | 5/2010 |
| KR | 20110138819 A | 12/2011 |
| TW | 201220584 A | 5/2012 |
| WO | 2006022362 A2 | 3/2006 |

OTHER PUBLICATIONS

CN Office Action dated Sep. 26, 2016, for CN application No. 201380030778.0.

* cited by examiner

TEMPERATURE CONTROL SYSTEM FOR A HIGH-TEMPERATURE BATTERY OR A HIGH-TEMPERATURE ELECTROLYZER

CROSS REFERENCE TO RELATED APPLICATIONS

This application is the US National Stage of International Application No. PCT/EP2013/059900 filed May 14, 2013, and claims the benefit thereof. The International application claims the benefit of German Application No. 102012209698.1 filed Jun. 11, 2012. All of the applications are incorporated by reference herein in their entirety.

FIELD OF INVENTION

The present invention relates to a control system for temperature control of a high-temperature battery which is supplied with hot air via a piping system, or of high-temperature electrolyzer which is supplied with hot air via a piping system.

BACKGROUND OF INVENTION

A high-temperature battery, and also a high-temperature electrolyzer, have to be supplied with sufficient heat for providing a suitable operating temperature. Therefore, in a high-temperature battery as described in DE 10 2009 057 720.3, for example, heating of the battery cell up to a temperature level of at least 700° C. is necessary in order to be able to ensure an efficient operation. Equally, high-temperature electrolyzers, as described in EP12163588, for example, are to be supplied with heat in order to be able to operate an efficient electrochemical gas separation plant. The efficiency of both devices is influenced significantly by the operating temperature which, for example, determines the necessary ion fluxes in the devices.

The necessary heat is made available in this case, at least partially, by a flow of hot air which is fed to the high-temperature battery or to the high-temperature electrolyzer. The temperature level of this hot air, however, does not have to achieve the operating temperature level of the high-temperature battery or of the high-temperature electrolyzer but should be high enough in order to be able to make a significant heat contribution. In the present case, thermally conditioned air, the temperature level of which lies above the ambient temperature level, is therefore to be understood by hot air. Within the scope of the present invention, a high-temperature battery, and also a high-temperature electrolyzer, is to have an operating temperature of at least 300° C., preferably of at least 650° C. In particular, the temperatures are to be high enough in order to be able to operate, according to design, a high-temperature battery or a high-temperature electrolyzer which work at least partially on the basis of a solid electrolyte fuel cell (SOFC). In this case, temperatures of at least 650° C. are typically required.

Comparable operating preconditions are known from the technical scope of high-temperature fuel cells which are designed as a solid electrolyte fuel cell (SOFC). Thus, it is described in US 2004/0013913 A1, for example, that such a high-temperature fuel cell is supplied with heated air by means of an air piping system. The heating is carried out in this case so that the air which is fed to the high-temperature fuel cell is conditioned by means of a heat exchanger and a suitable heating device. The energy which is released from the heat exchanger to the air is partially extracted from a backflow pipe which discharges used air from the high-temperature fuel cell and feeds it to the heat exchanger. Depending on the amount of hot air which is discharged from the high-temperature fuel cell, a greater or lesser quantity of heat can therefore be fed again, by means of the heat exchanger, in a thermal recirculation circuit to the high-temperature fuel cell, as a result of which the overall heat loss can be minimized. Moreover, with increased recirculation the temperature gradient across the fuel cell can be reduced. The controlling of the overall quantity of thermal energy which is fed to the air flow is undertaken by a control system which determines the additional external heat input in order to be able to ultimately supply the high-temperature fuel cell with sufficient overall heat.

Since, however, unlike in the case of a high-temperature fuel cell, the operation of a high-temperature battery or of a high-temperature electrolyzer is typically carried out under different and temporally variable load- and working conditions, a temporally varying supply of the high-temperature battery or of the high-temperature electrolyzer with thermal heat is necessary. A process step absorbing electric energy is typically conducted endothermally in the case of a high-temperature electrolyzer, which necessitates a feed of heat. In contrast to this, a process step releasing chemical energy is typically conducted exothermally. If the operation of a high-temperature electrolyzer is now carried out in such a way that both types of operation are undertaken alternately, a varying supply with heat is necessary. Similarly, a high-temperature battery can be operated in two different working states, being an electric energy-absorbing and endothermal charging state and also an electric energy-releasing and exothermal discharging state. Consequently, a varying supply with heat is also necessary here if both working states are selected alternately with each other.

Furthermore, high-temperature batteries or high-temperature electrolyzers can be provided for absorbing surplus energy from renewable, fluctuating energy sources (wind energy, solar energy). This leads to a continuous change of the power to be absorbed and therefore also to changes in their working state.

Different working states, however, typically also require mass flows in the air supply which differ from each other. As a result, the operation of a high-temperature battery or of a high-temperature electrolyzer differs in principle, however, from that of a high-temperature fuel cell which typically has only a single defined working state.

If a high-temperature battery or a high-temperature electrolyzer has to be supplied with temporally varying mass flows of air, it is shown that the thermal conditioning, as described in US 2994/0013913 A1, cannot be operated with adequate efficiency. Under such circumstances, there may specifically be a requirement for a higher thermal heat input into the air flow which can be covered only by providing large quantities of thermal energy by means of an external heat source. The exclusively thermal injection of heat from the backflow pipe proves energetically to be of insufficient advantage in this case. Moreover, the control speed can prove to be insufficient for the rapid heating of large air flows.

Consequently, it is technically necessary to propose a control system for temperature control of a high-temperature battery which is supplied with hot air via a piping system, or of a high-temperature electrolyzer which is supplied with hot air via an air piping system, which avoids the disadvantages from the prior art. In particular, an energy-efficient operation is also to be enabled in the case of varying mass flows in the air supply. Furthermore, the supply of a high-temperature battery or of a high-temperature electrolyzer with a temporally varying mass flow is to be enabled, wherein the thermal conditioning of this mass flow is carried out in a comparatively energy-efficient manner.

SUMMARY OF INVENTION

These objects upon which the present invention is based are achieved by means of a control system as claimed.

In particular, these objects upon which the present invention is based are achieved by means of a control system for temperature control of a high-temperature battery which is supplied with hot air via an air piping system, or of a high-temperature electrolyzer which is supplied with hot air via an air piping system, which control system has at least two temperature probes which are designed for detecting the temperature at two different points of the air piping system, and also at least one first conditioning unit—for physically conditioning the air—which is connected upstream into the air piping system with regard to the high-temperature battery or to the high-temperature electrolyzer, and also a feedback pipe which feeds back hot air discharged from the high-temperature battery or from the high-temperature electrolyzer to a point of the air piping system and feeds the hot air into this again, which point is arranged upstream with regard to the high-temperature battery or to the high-temperature electrolyzer, wherein the control system controls the first conditioning unit in dependence upon the temperatures which are detected by the temperature probes.

At this point, it may be noted that according to embodiments of the invention the air piping system comprises both all the sections of the air feed piping as well the air discharge piping. The air piping system also comprises the sections which are suitable for the hot air piping inside the high-temperature battery or inside the high-temperature electrolyzer.

The control system according to embodiments of the invention according to the independent claim is consequently designed so that at least some of the hot air discharging from the high-temperature battery or from the high-temperature electrolyzer is fed back to the air piping system and fed into it again, wherein the feed is carried out at a point which is arranged upstream with regard to the high-temperature battery or to the high-temperature electrolyzer. Consequently, not only thermal energy is delivered to the air flow which supplies the high-temperature battery or the high-temperature electrolyzer but temperature-conditioned hot air. As a result, the air flow is altered not only with regard to its heat content but also with regard to its mass flow.

At the same time, the air flow can also be altered with regard to its chemical composition since the hot air discharging from the high-temperature battery or from the high-temperature electrolyzer can be altered with regard to its composition, that is to say with regard to the individual partial pressures. Therefore, it is possible, for example, that hot air discharging from a high-temperature battery or a high-temperature electrolyzer has an increased or sometimes even reduced level of oxygen. By mixing the recirculated hot air for example with fresh air the oxygen content in the air which is fed again to the high-temperature battery or to the high-temperature electrolyzer can consequently be adjusted. As a result, the efficiency of the electrochemical processes in the high-temperature battery or in the high-temperature electrolyzer can also be influenced, however, since these are dependent upon concentration.

Furthermore, the control system according to embodiments of the invention provides that there is provision for at least one conditioning unit which is controlled in dependence upon the temperatures which are detected by the temperature probes. The conditioning unit can be suited in this case to conditioning the air flow only with regard to its heat content or also with regard to its mass flow. Equally, a simultaneous conditioning of thermal heat content and also mass flow is also conceivable. The temperature probes in this case detect the temperature of the air at different points of the air piping systems so that by comparing both temperatures a suitable operating change of the conditioning unit can be undertaken. The operating change is consequently initiated by the control system as a reaction of a detected temperature difference.

If the high-temperature battery is now operated in a charging state, for example, this typically requires an increased supply with air of a high temperature level in order to first of all enable the charging state. On account of the thermal energy consumption in the high-temperature battery, the hot air flow discharging from the high-temperature battery consequently has a relatively lower temperature level than the air flow entering the high-temperature battery. The situation is different, however, during a discharging state, during which the high-temperature battery itself generates thermal heat and transfers this to the air flow, wherein the heat from the high-temperature battery is discharged with the hot air flow. The supplying of the high-temperature battery during a discharging state requires a small heat input with the supplying air flow. If, however, the high-temperature battery is transferred from a discharging state into a charging state, the heat which is present in the high-temperature battery can furthermore be suitably discharged from this with the hot air flow and fed again to the air piping system after feeding has been carried out. In this case, a change of the air mass flow is sometimes required.

According to an embodiment of the invention, in the starting phase of the charging state the air flow can now be advantageously conditioned both thermally and with regard to the mass flow by means of the hot air which is discharged from the high-temperature battery. In this case, the quantity of heat which is discharged from the high-temperature battery with the hot air flow is increasingly reduced during the course of the charging state. To the degree in which this quantity of heat is reduced, the hot air flow which is fed to the high-temperature battery can be thermally conditioned by means of a variable heat input. At the same time, however, conditioning of the mass flow can also be carried out if this is necessary.

Like a high-temperature battery has to be supplied with an air flow of variable thermal heat content and also a variable mass flow during different working states, then a high-temperature electrolyzer is also sometimes to be supplied with variable quantities of heat or with a variable mass flow of air during different operating states.

Therefore, as in the embodiment of a high-temperature electrolyzer which is described further above and known from the prior art, such a high-temperature electrolyzer can be operated in various working states. In this case, a working state may require a relatively increased supply with thermal energy and also an adapted and altered mass flow. Above all, however, during such transition states, that is to say in the case of a changing working state, a modification with regard to the temperature level and the mass flow is typically required. In order to consequently achieve an efficient thermal conditioning of the air flow with also advantageous conditioning of the mass flow at the same time, the control system according to an embodiment of the invention can be advantageously used.

According to an advantageous embodiment of the invention it can provided that controlling of the first conditioning unit can also be controlled in dependence upon the detected temperature difference. In this case, it is therefore possible that the control system does not process two different temperature values as control variables but that this picks up only one control variable, specifically the temperature difference for system controlling. The temperature difference can in this case be advantageously enabled by means of an electronic comparator circuit.

According to a further advantageous embodiment, it is provided that the control system has a second conditioning unit, connected into the feedback pipe, which is designed as a flow generator and is suitable for applying a flow to the hot air which is present in the feedback pipe, wherein the control system also controls this second conditioning unit in dependence upon the temperatures which are detected by the temperature probes. The second conditioning unit, which is connected into the feedback pipe, enables a simultaneous feed back of thermal energy and also a change of the mass flow. Accordingly, changing demands upon the thermal heat content of the air flow and also upon the mass flow can particularly then be reacted to in a targeted manner by a suitable adjustment of the second conditioning unit. If, for example, a higher mass flow is to be fed to the high-temperature battery or to the high-temperature electrolyzer with an increased quantity of heat at the same time, this can be achieved by an increased hot air flow in the feedback pipe. According to one embodiment, the second conditioning unit can be constructed as an injector and/or ejector, especially as a gas-jet pump, or, according to another embodiment, as a compressor pump. Furthermore, it is also possible that this second conditioning unit is controlled not in dependence upon the individually detected temperature values but on the basis of a temperature difference value.

According to a continuation of this embodiment, it can also be provided that the feedback pipe has suitable adjustment devices which enable a targeted change of the mass flow in the feedback pipe. Such adjustment devices can be constructed as valves, for example.

According to a further advantageous embodiment of the invention, it is provided that a first temperature probe in provided in the air piping system at a first point upstream of the high-temperature battery or upstream of the high-temperature electrolyzer, and another, second temperature probe is provided in the air piping system at a second point downstream of the high-temperature battery or downstream of the high-temperature electrolyzer. The control system consequently allows suitable controlling of the conditioning units provided upstream on the basis of the temperature field which is established between the measurement points. By the same token, a conditioning unit which is connected into the feedback pipe can also be suitably controlled. The measuring of the temperatures upstream and downstream of the high-temperature battery or high-temperature electrolyzer in this case requires no further knowledge of the temperature distribution in the high-temperature battery or in the high-temperature electrolyzer and consequently constitutes a particularly simple control process.

The situation is different in the case of a further embodiment which provides a first temperature probe in the air piping system at a first point upstream of the high-temperature battery or upstream of the high-temperature electrolyzer, and another, second temperature probe in the high-temperature battery or in the high-temperature electrolyzer. Controlling on the basis of temperatures detected in the high-temperature battery or in the high-temperature electrolyzer certainly requires a continuing knowledge of the processes in these devices, so a targeted or temporally faster controlling of the conditioning units can sometimes be carried out, however, on the basis of this knowledge. In particular, better consideration can therefore be given to the varying temperature conditions in the high-temperature battery or in the high-temperature electrolyzer during an operating change.

According to a further embodiment of the invention, it is provided that at least three temperature probes are provided, wherein a first temperature probe is provided in the air piping system at a first point upstream of the high-temperature battery or upstream of the high-temperature electrolyzer, a second temperature probe is provided in the air piping system at a second point downstream of the high-temperature battery or downstream of the high-temperature electrolyzer, and third temperature probe is provided in the high-temperature battery or in the high-temperature electrolyzer. Consequently, at least three temperature values are made available to the control system, which enables an advantageous controlling of the conditioning units which is also suitably matched to the control state. In particular, in the case of changing operating states, the knowledge of different temperature values of the air piping system can enable a detailed knowledge of the running processes, as a result of which an advantageous controlling of the conditioning units is enabled.

According to a further embodiment of the invention, the first conditioning unit is designed as a heating device which is suitable for supplying heat to the hot air which is present in the air distribution system. Depending on the control state, the heating device delivers a greater or lesser amount of heat to the air flow which is present in the air piping system. According to a further embodiment, the first conditioning unit can also be designed as a flow generator which is designed for applying a flow to the air which is present in the air piping system. The application of the flow is especially carried out in a variable manner. Therefore, in the event of a demand for an increase of the mass flow, for example, the flow generator can be controlled in such a way that an increased flow is applied to the air flow. In this case, reference is also to be made to the fact that when applying the flow the air does not have to experience any thermal conditioning. Therefore, according to an embodiment of the invention it is also sufficient to apply a flow to fresh air which is introduced into the air piping system and is only thermally conditioned afterwards.

By means of the flow generator, the content of oxygen in the air which is present in the air piping system can also be advantageously adjusted. Therefore, the quantity or the proportion of fresh air in comparison to recirculated hot air can be influenced, for example. Since in particular the hot air discharging from the high-temperature battery or from the high-temperature electrolyzer sometimes has an increased amount of oxygen or sometimes even a reduced amount of oxygen, by mixing the recirculated hot air with fresh air the oxygen content in the air which is fed again to the high-temperature battery or to the high-temperature electrolyzer can be adjusted. As a result, however, the efficiency of the electrochemical processes in the high-temperature battery or in the high-temperature electrolyzer can also be influenced. For example, in a discharging state of a high-temperature battery a higher oxygen content can lead to a temporally faster discharging, as a result of which a higher energy density can be made available, for example.

According to a further, extremely advantageous embodiment of the invention, it can be provided that the control system has at least two conditioning units which are connected into the air piping system upstream with regard to the high-temperature battery or to the high-temperature electrolyzer, wherein one conditioning unit is designed as a heating device which is suitable for supplying heat to the air which is present in the air piping system, and one conditioning unit is designed as a flow generator which is suitable for applying a flow to the air which is present in the air piping system, wherein the control system controls the two conditioning units in dependence upon the temperature difference which is detected by the temperature probes. Alternatively, controlling can also be carried out on the basis of the temperature difference which is detected by the temperature probes. According to the embodiment, the control system consequently allows a simultaneous influencing of the mass flow in the air piping system and also a conditioning, separate therefrom, of the heat content of the hot air. Consequently, both physical parameters can be adjusted in a suitable manner and comparatively independently of each other. Accordingly, corresponding operating changes in the high-temperature battery or in the high-temperature electrolyzer can be reacted to comparatively quickly. Furthermore, it is possible to carry out the controlling of the first conditioning unit and second conditioning unit in an energy-optimized manner. In this case, the temporal energy consumption of the first conditioning unit and second conditioning unit, for example, can be taken into consideration as further control variables by the control system in addition to the control variables of the detected temperature values.

According to a continuation of this embodiment, it can be provided that the two conditioning units are designed as one component, and especially have a series connection in the component. In this way, the construction cost is noticeably reduced. According to a further embodiment of the invention, it is provided that the control system also has a second feedback pipe which feeds back hot air discharged from the high-temperature battery or from the high-temperature electrolyzer to a point of the air piping system, which point is arranged upstream with regard to the high-temperature battery or to the high-temperature electrolyzer. The second feedback pipe can be constructed separately from the high-temperature battery or from the high-temperature electrolyzer in this case, or can be led off from the first feedback pipe or from the air piping system as a branch pipe. The second feedback pipe, in common with the first feedback pipe, can open into the air piping system at the same point and can feed the air flow which is conducted in the second feedback pipe into the air piping system. A second feedback pipe allows an improved arrangement in this case with regard to flexibility when reacting to operating changes. The flexibility is especially improved when the second feedback pipe opens into the air piping system at a point which is not identical to the first point at which the first feedback pipe opens into the air piping system. Accordingly, different quantities of thermal energy and also hot air can be fed to the air piping system at different points.

According to a continuation of this aspect, it is provided that the second feedback pipe conducts the hot air discharging from the high-temperature battery or from the high-temperature electrolyzer to a heat exchanger which is designed for heating the air flow in the air piping system before it is fed to the high-temperature battery or to the high-temperature electrolyzer. Conditioning of the hot air which is present in the air piping system can consequently only be thermally carried out without at the same time also influencing the mass flow of the hot air in the air piping system as well. This in turn increases the flexibility and control diversity in the case of different operating requirements.

According to a continuation of this embodiment, it is provided that the heat exchanger is connected into the air piping system upstream with regard to the first conditioning unit. Particularly when the first conditioning unit is constructed as a heating device can an energetically efficient thermal conditioning of the air in the air piping system be therefore carried since only the differential amount of the heat, which the heat exchanger cannot provide, has to be made available by the first conditioning unit.

Aspects of the invention are described in detail below based on individual embodiments. In this case, however, the generality of the claimed embodiments of the invention shall not be impaired.

The individual features which are explained in the embodiments described below shall be claimed on their own and also in combination with other presently described features. In particular, each combination of these individual features shall be claimed in the present case.

Reference is furthermore to be made to the fact that the embodiments which are represented in the figures are to be understood only schematically without, however, a possible substantiation of the invention being able to be challenged thereby. A person skilled in the art can make a substantiation based on his, or her, general specialized knowledge in light of the present disclosure.

DETAILED DESCRIPTION OF INVENTION

Figure 1:
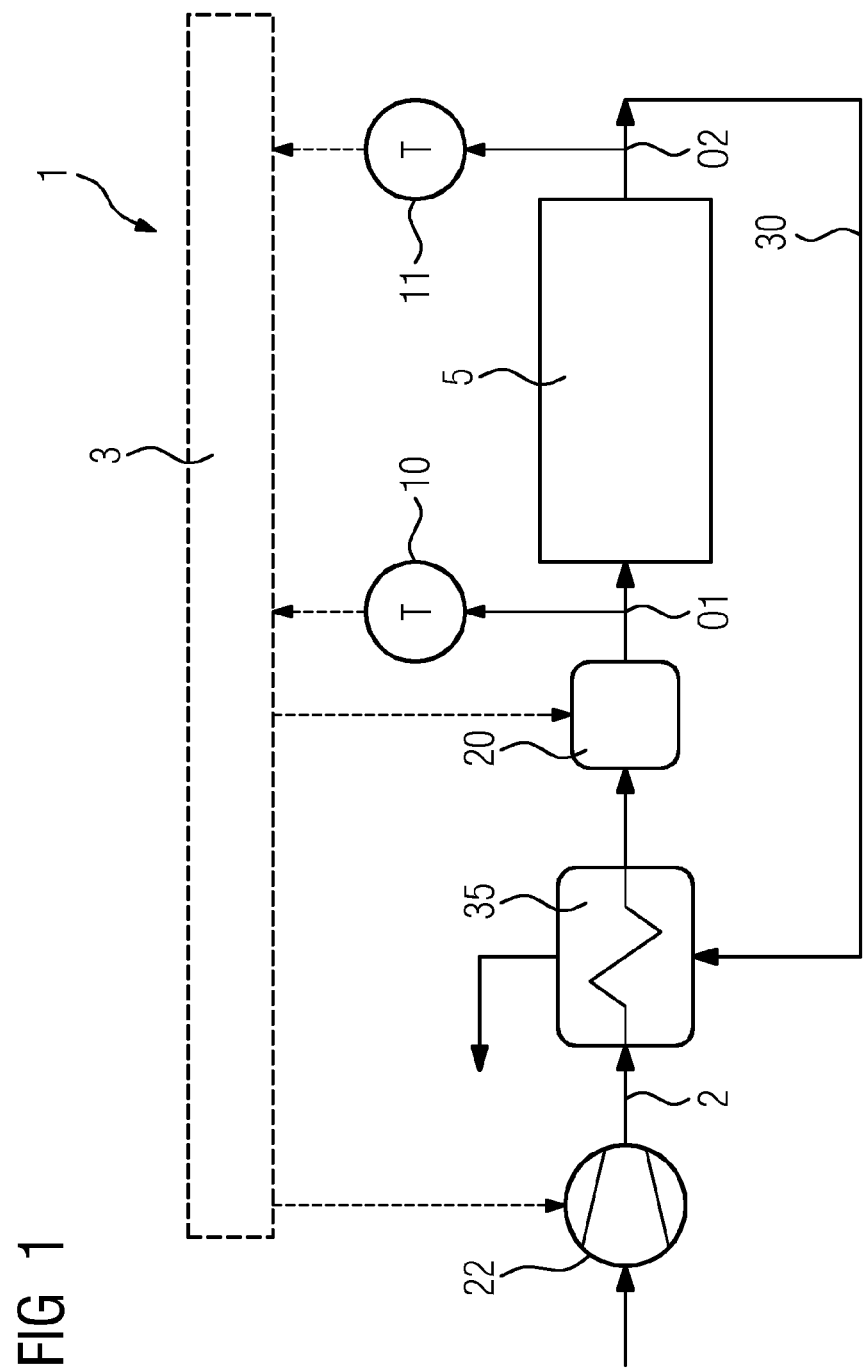
FIG. 1 shows an embodiment of a control system which is not being claimed in the present case.

FIG. 1 shows an embodiment of a control system 1 which is not being claimed in the present case. In this case, the control system 1 comprises an air piping system 2 for supplying a high-temperature battery 5 or a high-temperature electrolyzer 5 with hot air. For conditioning the air which is present in the air piping system 2, provision is made for a first conditioning unit 20, a heat exchanger 35 and also a third conditioning unit 22. The first conditioning unit 20 is designed in this case as a heating device which thermally conditions the air which is present in the air piping system 2. With regard to the first conditioning unit 20, the heat exchanger 35 is provided upstream and is also designed for thermally conditioning the air which is present in the air piping system 2. The heat exchanger 35 enables thermal energy to be extracted from a hot air flow which is fed back from the high-temperature battery 5 or from the high-temperature electrolyzer 5 in order to transfer this to the air flow which is fed to the high-temperature battery 5 or to the high-temperature electrolyzer 5. In the process, the heat exchanger 35 exclusively allows a thermal conditioning without changing the mass flow of the hot air flow which is present in the air piping system 2.

Also arranged upstream with regard to the heat exchanger 35 is a third conditioning unit 22 which is designed as a flow generator. The flow generator 22 enables a flow to be applied to the air which is present in the air piping system and consequently enables a variation of the mass flow. In order to achieve suitable conditioning of the air flow in the air piping system 2, a control unit 3 controls the operating state of the first conditioning unit 20 and also of the third conditioning unit 22. The controlling is carried out in this case in dependence upon the temperature values which are detected by a first temperature probe 10 as well as by a second temperature probe 11. The detecting of the temperature values is correspondingly carried out at a first point 01 upstream of the high-temperature battery or upstream of the high-temperature electrolyzer 5 and also at a second point 02 downstream of the high-temperature battery or downstream of the high-temperature electrolyzer.

Figure 2:
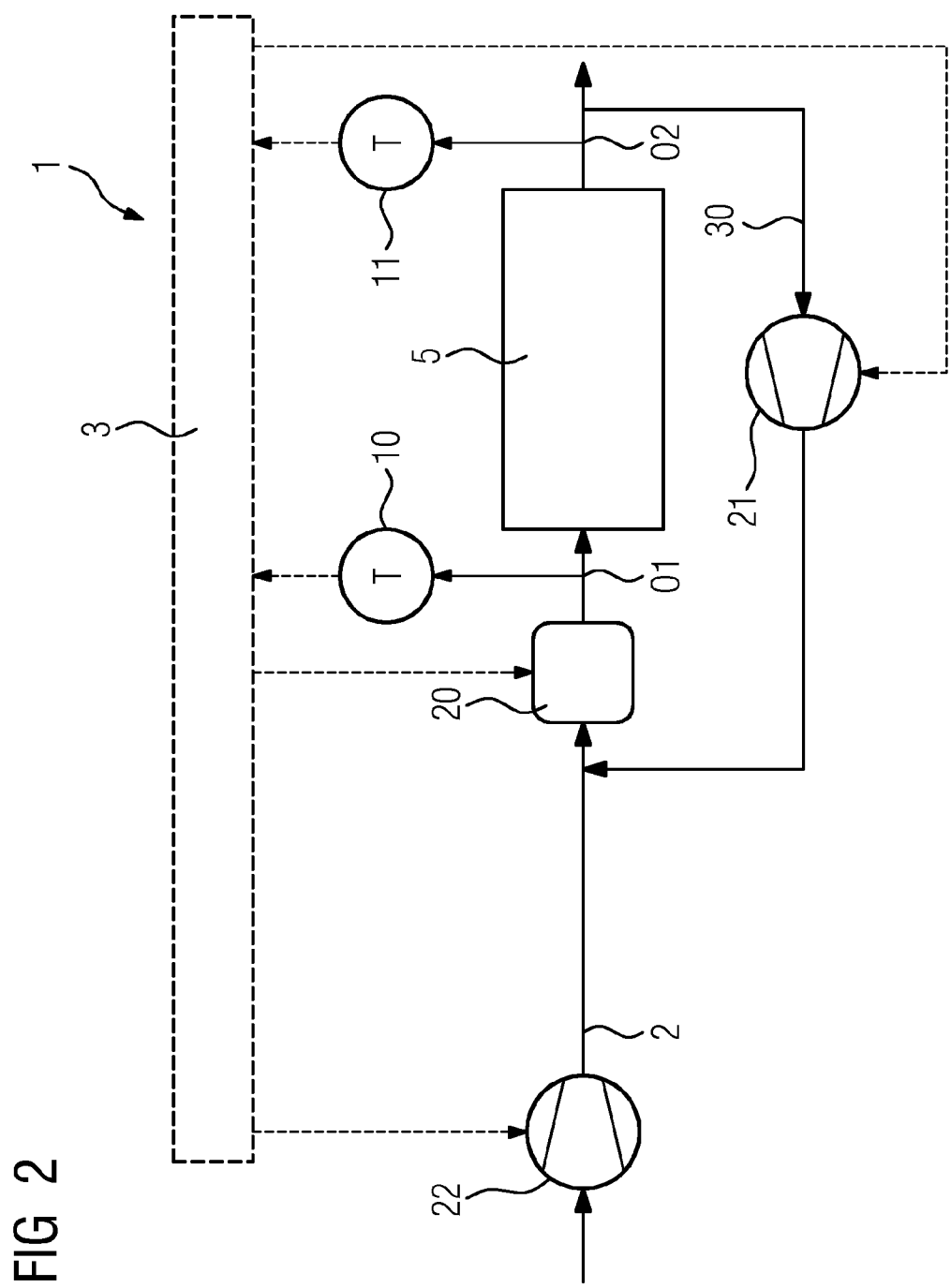
FIG. 2 shows a first embodiment of the control system according to the invention in a schematic view of connections.

FIG. 2 shows a first embodiment of a control system 1 according to the invention which also enables the supplying of a high-temperature battery 5 or of a high-temperature electrolyzer 5 with hot air via an air piping system 2. In comparison to the embodiment shown in FIG. 1, however, the hot air discharging from the high-temperature battery 5 or the high-temperature electrolyzer 5 is not fed back to a heat exchanger for thermal conditioning but after its feed back to the air piping system 2 is completely fed into this. In this case, conditioning is carried both of the thermal heat content and of the mass flow of the air flow in the air piping system 2.

The feed back is carried out via a first feedback pipe 30 which is connected to a second conditioning unit 21. The second conditioning unit 21 is designed as a flow generator which determines the flow volume of the fed-back hot air in the first feedback pipe 30. Depending on the operating state, the flow generator 21 can recirculate a larger or a smaller quantity of hot air by means of the feedback pipe 30. As a result, the quantity of hot air which is fed to the high-temperature battery 5 or to the high-temperature electrolyzer 5 can be temporally conditioned both with regard to the thermal heat quantity and to the mass flow. After the feedback of the hot air discharging from the high-temperature battery 5 or from the high-temperature electrolyzer 5 has been carried out, this is mixed with additional air in the air piping system 2. In this case, it may be fresh air or already conditioned air, for example.

In order to be able to additionally thermally condition the air flow which is fed to the high-temperature battery 5 or to the high-temperature electrolyzer 5, provision is also made for a first conditioning unit 20 which thermally conditions the air flow present in the air piping system 2 in the sense of a heating device.

Both the first conditioning unit 20 as well as the second conditioning unit 21 and the third conditioning unit 22 are operated by means of a control unit 3 which again picks up the detected temperature values of a first temperature probe 10 and of a second temperature probe 11 as control variables. By means of the first temperature probe 10, the temperature of the hot air is measured at a first point 01 upstream with regard to the high-temperature battery 5 or the high-temperature electrolyzer 5. The second temperature probe 11 is designed for measuring the temperature at a second point 02 downstream of the high-temperature battery 5 or of the high-temperature electrolyzer 5.

On account of the controlled feedback of hot air from the high-temperature battery 5 or from the high-temperature electrolyzer 5 into the air piping system 2 upstream with regard to the high-temperature battery 5 or to the high-temperature electrolyzer 5, an energetically efficient and—with regard to the demands during a change of the operating state of the high-temperature battery 5 or of the high-temperature electrolyzer 5—advantageous recirculation of the hot air can be carried out. Particularly during changes of the operating state, which require a simultaneous change of the mass flow and also of the thermal heat capacity, the air flow which is fed to the high-temperature battery 5 or to the high-temperature electrolyzer 5 can thus be advantageously conditioned.

Figure 3:
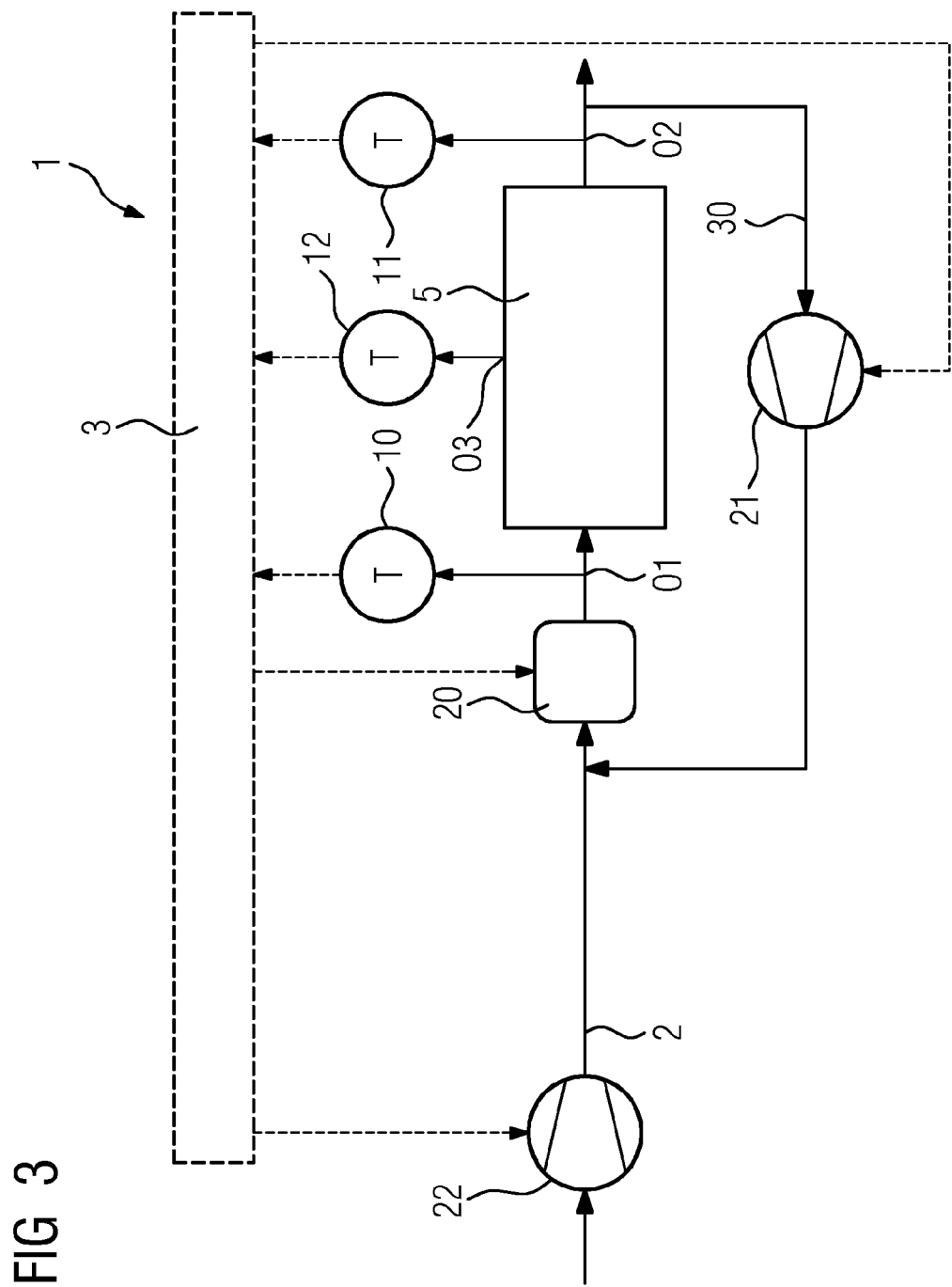
FIG. 3 shows a further embodiment of the invention according to a schematic view of connections.

FIG. 3 shows a further embodiment of the invention which differs from the embodiment shown in FIG. 2 only to the effect that the control unit 3 has three temperature probes 10, 11, 12 which take temperature measurements at different points of the air piping system 2. In this case, as in the embodiment according to FIG. 2, a temperature value is detected by means of a first temperature probe 10 at a point 01 both upstream with regard to the high-temperature battery 5 or to the high-temperature electrolyzer 5. In addition, a second temperature value is detected by means of a second temperature probe 11 at a second point 02 downstream with regard to the high-temperature battery 5 or to the high-temperature electrolyzer 5. In addition, a temperature value, which is picked up by means of a third temperature probe 12, is also be detected at a third point 03. The third point 03 is arranged in the high-temperature battery 5 or in the high-temperature electrolyzer 5. In this case, the third point 03, as provided according to the embodiment, can be arranged in the air piping system 2. By the same token, however, it is also possible in principle to detect temperature values at other points of the high-temperature battery 5 or of the high-temperature electrolyzer 5 outside the air piping system 2.

Figure 4:
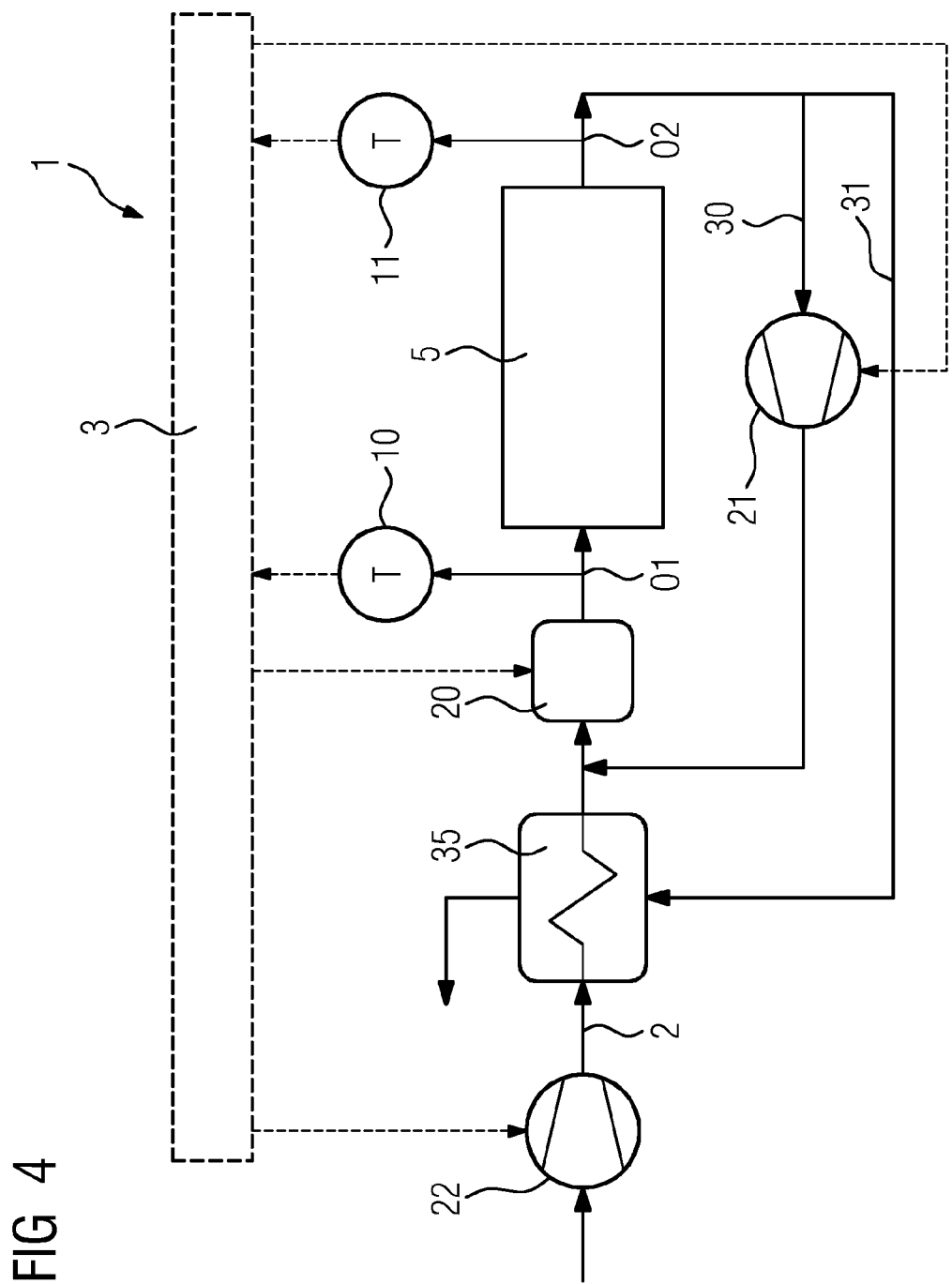
FIG. 4 shows a further embodiment of the invention according to a schematic view of connections.

FIG. 4 shows a further embodiment of the invention which differs from the embodiment shown in FIG. 2 only to the effect that provision is made for a second feedback pipe 31. The second feedback pipe 31 is designed as a branch pipe of the first feedback pipe 30. The second feedback pipe 31 feeds a design-specified proportion of fed-back hot air to a heat exchanger 35 which is connected into the air piping system between the first conditioning unit 20 and the third conditioning unit 22. The heat exchanger 35 is suitable for thermally conditioning the air which is present in the air piping system 2. Whereas, therefore, the first feedback pipe 30 enables both a thermal conditioning as well as a conditioning with regard to the mass flow of the air flow conducted in the air piping system 2, the second feedback pipe 31 allows only a thermal conditioning. According to the embodiment, it is possible to provide suitable adjustment devices, for example valves, both in the first feedback pipe 30 as well as in the second feedback pipe 31. By the same token, it is possible to connect a further, fourth conditioning unit (not shown in the present case) into the second feedback pipe 31. This fourth conditioning unit can be designed as a flow generator.

Further embodiments are gathered from the dependent claims.

The invention claimed is:

1. A control system for temperature control of a high-temperature battery which is supplied with hot air via an air piping system or of a high-temperature electrolyzer which is supplied with hot air via an air piping system, comprising:
at least two temperature probes, wherein said temperature probes are designed for detecting the temperature at two different points of the air piping system, and also
at least one first conditioning unit, for a physical conditioning of the air, which is connected into the air piping system upstream with regard to the high-temperature battery or to the high-temperature electrolyzer, wherein the conditioning unit is designed as a heating device which is suitable for supplying heat to the air which is present in the air piping system, and also a feedback pipe, wherein said feedback pipe feeds back hot air discharged from the high-temperature battery or from the high-temperature electrolyzer to a point of the air piping system and feeds the hot air into this again, which point is arranged upstream with regard to the high-temperature battery or to the high-temperature electrolyzer, wherein the control system controls the first conditioning unit in dependence upon the temperatures which are detected by the temperature probes.

2. The control system as claimed in claim 1, wherein the control system further comprises a second conditioning unit, connected into the feedback pipe, which is designed as a flow generator and is suitable for applying a flow to the hot air which is present in the feedback pipe, wherein the control system also controls this second conditioning unit in dependence upon the temperatures which are detected by the temperature probes.

3. The control system as claimed in claim 1, wherein a first temperature probe is provided in the air piping system at a first point upstream of the high-temperature battery or upstream of the high-temperature electrolyzer, and another, second temperature probe is provided in the air piping system at a second point downstream of the high-temperature battery or downstream of the high-temperature electrolyzer.

4. The control system as claimed in claim 1, wherein a first temperature probe is provided in the air piping system at a first point upstream of the high-temperature battery or upstream of the high-temperature electrolyzer, and another, second temperature probe is provided in the high-temperature battery or in the high-temperature electrolyzer.

5. The control system as claimed in claim 1, wherein provision is made for at least three temperature probes, wherein a first temperature probe is provided in the air piping system at a first point upstream of the high-temperature battery or of the high-temperature electrolyzer, a second temperature probe is provided in the air piping system at a second point downstream of the high-temperature battery or downstream of the high-temperature electrolyzer, and a third temperature probe is provided in the high-temperature battery or in the high-temperature electrolyzer.

6. The control system as claimed in claim 1, wherein the control system has at least two conditioning units which are connected into the air piping system upstream with regard to the high-temperature battery or to the high-temperature electrolyzer, wherein a second conditioning unit of the at least two conditioning units is designed as a flow generator which is suitable for applying a flow to the air which is present in the air piping system, wherein the control system controls the two conditioning units in dependence upon the temperature difference which is detected by the temperature probes.

7. The control system as claimed in claim 6, wherein the two conditioning units are designed as one component.

8. The control system as claimed in claim 1, wherein the control system further comprises a second feedback pipe which feeds back hot air discharged from the high-temperature battery or from the high-temperature electrolyzer to a point of the air piping system, which point is arranged upstream with regard to the high-temperature battery or to the high-temperature electrolyzer.

9. The control system as claimed in claim 8, wherein the second feedback pipe conducts the hot air discharging from the high-temperature battery or from the high-temperature electrolyzer to a heat exchanger which is designed for heating the hot air in the air piping system before it is fed to the high-temperature battery or to the high-temperature electrolyzer.

10. The control system as claimed in claim 9, wherein the heat exchanger is connected into the air piping system upstream with regard to first conditioning unit.

11. The control system as claimed in claim 7, wherein the two conditioning units are designed as one component, and have a series connection in the component.

12. A control system for temperature control of a high-temperature battery which is supplied with hot air via an air piping system or of a high-temperature electrolyzer which is supplied with hot air via an air piping system, comprising at least two temperature probes, wherein said temperature probes are designed for detecting the temperature at two different points of the air piping system, and also a first conditioning unit for heating of air enroute to the high-temperature battery or to the high-temperature electrolyzer, a feedback pipe, wherein said feedback pipe feeds back hot air discharged from the high-temperature battery or from the high-temperature electrolyzer to a point of the air piping system upstream with regard to the high-temperature battery or to the high-temperature electrolyzer, and a heat exchanger from transferring heat from the hot air discharged from the high-temperature battery or from the high-temperature electrolyzer in the feedback pipe to the air enroute to the high-temperature battery or to the high-temperature electrolyzer, wherein the control system controls the first conditioning unit in dependence upon the temperatures which are detected by the temperature probes.

13. A control system for temperature control of a high-temperature battery which is supplied with hot air or of a high-temperature electrolyzer which is supplied with hot air, comprising:

an air piping system that intakes fresh air at an inlet and that delivers the hot air to the high-temperature battery or the high-temperature electrolyzer, wherein the hot air comprises the fresh air;

at least two temperature probes, wherein said temperature probes are designed for detecting the temperature at two different points of the air piping system, at least one first conditioning unit, for heating of air in the air piping system, which is connected into the air piping system upstream with regard to the high-temperature battery or to the high-temperature electrolyzer, and a feedback pipe, wherein said feedback pipe feeds back hot air discharged from the high-temperature battery or from the high-temperature electrolyzer to a point of the air piping system and feeds the hot air into this again, which point is arranged upstream with regard to the high-temperature battery or to the high-temperature electrolyzer, wherein the control system controls the first conditioning unit in dependence upon the temperatures which are detected by the temperature probes.

14. The control system as claimed in claim 13, wherein the control system controls the feed of the hot air into point of the air piping system to adjust an oxygen content present in the air enroute to the high-temperature battery or the high-temperature electrolyzer.

* * * * *